US012573655B2

(12) United States Patent
Chung et al.

(10) Patent No.: US 12,573,655 B2
(45) Date of Patent: Mar. 10, 2026

(54) LITHIUM-SULFUR SECONDARY BATTERY

(71) Applicant: LG ENERGY SOLUTION, LTD., Seoul (KR)

(72) Inventors: Habin Chung, Daejeon (KR); Kwonnam Sohn, Daejeon (KR); Changhun Park, Daejeon (KR); Minsu Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 712 days.

(21) Appl. No.: 17/605,952

(22) PCT Filed: Oct. 8, 2020

(86) PCT No.: PCT/KR2020/013759
§ 371 (c)(1),
(2) Date: Oct. 22, 2021

(87) PCT Pub. No.: WO2021/085887
PCT Pub. Date: May 6, 2021

(65) Prior Publication Data
US 2022/0231323 A1 Jul. 21, 2022

(30) Foreign Application Priority Data

Oct. 28, 2019 (KR) ......................... 10-2019-0134367

(51) Int. Cl.
*H01M 10/0569* (2010.01)
*H01M 10/056* (2010.01)
(Continued)

(52) U.S. Cl.
CPC ..... *H01M 10/056* (2013.01); *H01M 10/0568* (2013.01); *H01M 10/0569* (2013.01);
(Continued)

(58) Field of Classification Search
CPC ......................................... H01M 10/056–0569
See application file for complete search history.

(56) References Cited

U.S. PATENT DOCUMENTS 6,569,573 B1 5/2003 Mikhaylik et al.
2010/0119956 A1* 5/2010 Tokuda ............... H01M 10/052
429/339
(Continued)

FOREIGN PATENT DOCUMENTS

JP 2002-25814 A 1/2002
JP 2003-514356 A 4/2003
(Continued)

OTHER PUBLICATIONS

Kang (Kang et al., "Cathode porosity is a missing key parameter to optimize lithium-sulfur battery energy density", Nature Communications, 2019, 10). (Year: 2019).*
(Continued)

*Primary Examiner* — Jonathan G Leong
(74) *Attorney, Agent, or Firm* — Birch, Stewart, Kolasch & Birch, LLP

(57) ABSTRACT

Disclosed is a lithium-sulfur secondary battery including a positive electrode, a negative electrode, a separator, and an electrolyte solution, wherein the electrolyte solution contains a lithium salt and a solvent, the solvent includes a nitrile-based solvent, a fluorinated ether-based solvent, and a disulfide-based solvent in a specific volume ratio, and thus for the positive electrode that satisfies the specific conditions of high loading and low porosity, the initial discharging capacity and average discharging voltage of the lithium-sulfur secondary battery containing the electrolyte solution may be improved.

5 Claims, 3 Drawing Sheets

(51) Int. Cl.

| | |
|---|---|
| *H01M 10/0568* | (2010.01) |
| *H01M 4/02* | (2006.01) |
| *H01M 10/0525* | (2010.01) |
| *H01M 10/14* | (2006.01) |

(52) U.S. Cl.
CPC .. *H01M 2004/021* (2013.01); *H01M 10/0525* (2013.01); *H01M 10/14* (2013.01); *H01M 2300/004* (2013.01)

(56) References Cited

U.S. PATENT DOCUMENTS

| | | | |
|---|---|---|---|
| 2012/0164541 A1 | 6/2012 | Darolles et al. | |
| 2014/0134501 A1 | 5/2014 | Li et al. | |
| 2014/0170459 A1 | 6/2014 | Wang et al. | |
| 2016/0181600 A1 | 6/2016 | Omoda et al. | |
| 2016/0218394 A1 | 7/2016 | Yamada et al. | |
| 2016/0344063 A1 | 11/2016 | Chang et al. | |
| 2018/0251681 A1* | 9/2018 | Zhang ............... | H01M 10/0567 |
| 2019/0393556 A1 | 12/2019 | Matsuoka et al. | |
| 2021/0075062 A1 | 3/2021 | Yang et al. | |

FOREIGN PATENT DOCUMENTS

| | | |
|---|---|---|
| JP | 2012-84384 A | 4/2012 |
| JP | 2015-534254 A | 11/2015 |
| JP | 2016-119165 A | 6/2016 |
| JP | 2019-46759 A | 3/2019 |
| KR | 10-2014-0025330 A | 3/2014 |
| KR | 10-2016-0060719 A | 5/2016 |
| KR | 10-2016-0074377 A | 6/2016 |
| KR | 10-2016-0136686 A | 11/2016 |
| KR | 10-2018-0065755 A | 6/2018 |
| KR | 10-2019-0063061 A | 6/2019 |
| WO | WO 2018/169028 A1 | 9/2018 |
| WO | WO 2019/059698 A2 | 3/2019 |

OTHER PUBLICATIONS

Emerce, Nur Ber, Damla Eroglu. "Effect of Electrolyte-to-Sulfur Ratio in the Cell on the Li—S Battery Performance." Journal of the Electrochemical Society, vol. 166, No. 8, 2019, pp. A1490-A1500. (Year: 2019).*

Chen et al., "Functional Organosulfide Electrolyte Promotes an Alternate Reaction Pathway to Achieve High Performance in Lithium-Sulfur Batteries", Angew. Chem. Int. Ed. 2016, 55, pp. 4231-4235.

Fotouhi et al., "Lithium-Sulfur Battery Technology Readiness and Applications—A Review", Energies 2017, 10, 1937, pp. 1-15.

International Search Report for PCT/KR2020/013759 (PCT/ISA/210) mailed on Jan. 15, 2021.

Kamphaus et al., "Effects of Dimethyl Disulfide Cosolvent on Li—S Battery Chemistry and Performance", Chem. Mater. 2019, 31, pp. 2377-2389.

Lee et al., "Directing the Lithium-Sulfur Reaction Pathway via Sparingly Solvating Electrolytes for High Energy Density Batteries", ACS Cent. Sci. 2017, 3, pp. 605-613.

Zhang et al., "Heterogeneous/Homogeneous Mediators for High-Energy-Density Lithium-Sulfur Batteries: Progress and Prospects", Adv. Funct. Mater. 2018, 1707536, pp. 1-23.

Chen et al.: "High capacity of lithium-sulfur batteries at low electrolyte/ sulfur ratio enabled by an organosulfide containing electrolyte", Nano Energ, vol. 31, 2017 (Available online Nov. 30, 2016), pp. 418-423.

Extended European Search Report for European Application No. 20883659.3, dated Jun. 21, 2022.

Cuisinier et al., "Unique behaviour of nonsolvents for polysulphides in lithium-sulphur batteries," Energy & Environmental Science, vol. 7, 2014, pp. 2697-2705.

* cited by examiner

【Figure 1】
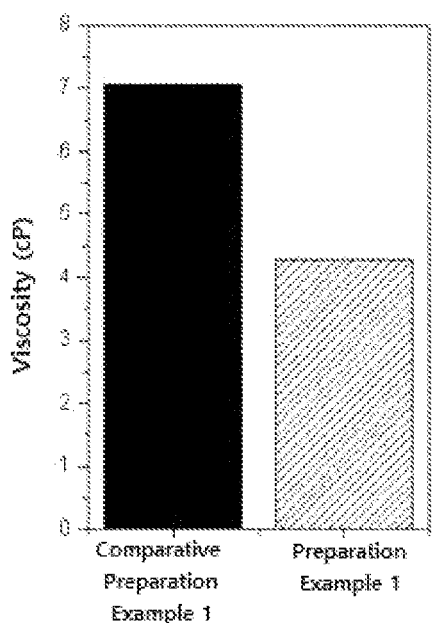
【Figure 2】
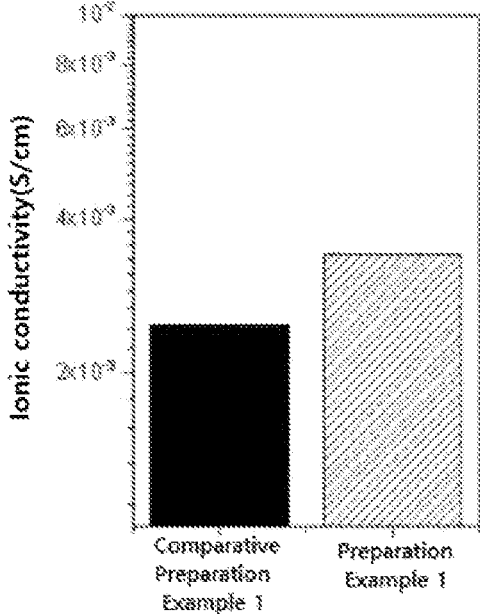

【Figure 3】
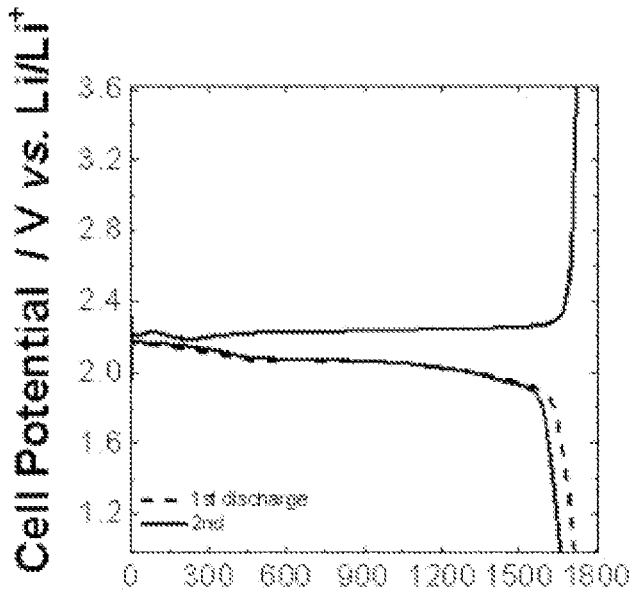
【Figure 4】
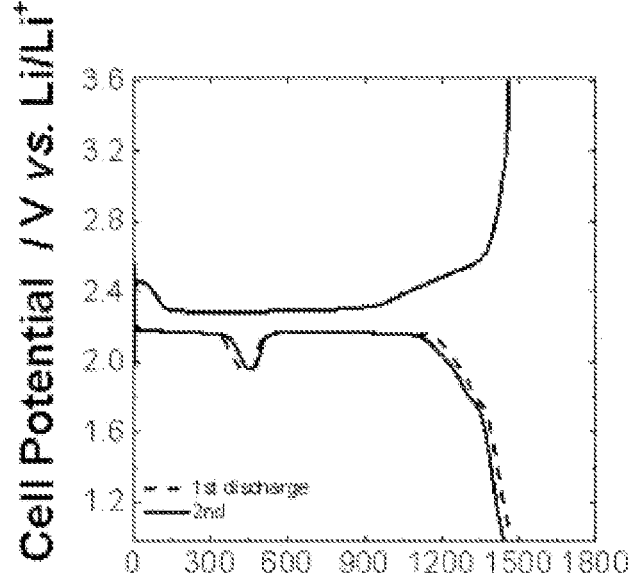

【Figure 5】
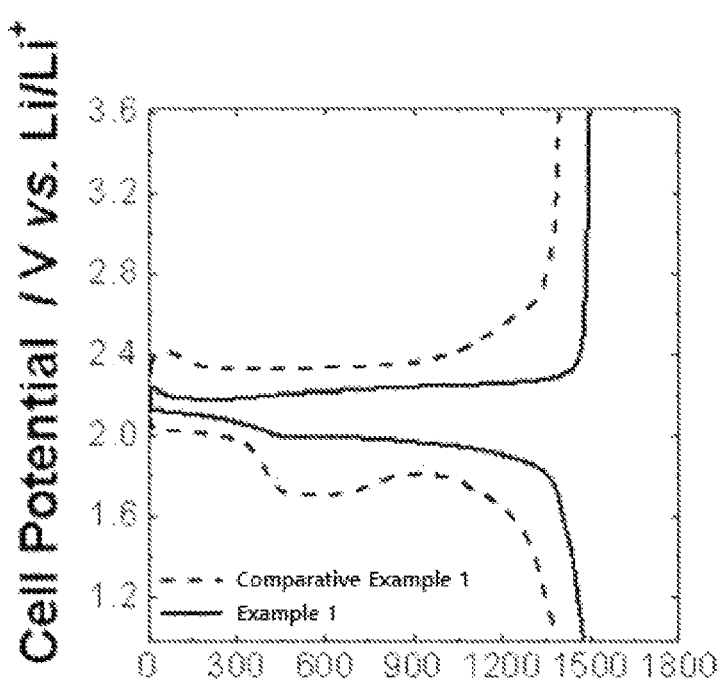

LITHIUM-SULFUR SECONDARY BATTERY

TECHNICAL FIELD

This application claims the benefit of priority based on Korean Patent Application No. 10-2019-0134367, filed on Oct. 28, 2019, all contents of which are incorporated herein by reference.

The present invention relates to a lithium-sulfur secondary battery.

BACKGROUND ART

As the application area of secondary battery are expanding to the electric vehicles (EV) or the energy storage devices (ESS), the lithium-ion secondary battery with relatively low weight-to-energy storage density (~250 Wh/kg) are facing limitations in application to such products. Alternatively, since the lithium-sulfur secondary battery can achieve the theoretically high weight-to-energy storage density (~2,600 Wh/kg), it is attracting attention as a next-generation secondary battery technology.

The lithium-sulfur secondary battery means a battery system using a sulfur-based material having an S—S bond (sulfur-sulfur bond) as a positive electrode active material and using lithium metal as a negative electrode active material. Sulfur, which is the main material of the positive electrode active material has advantages that it is very rich in resources, is not toxic, and has a low atomic weight.

In the lithium-sulfur secondary battery, when discharging the battery, lithium which is a negative electrode active material is oxidized while releasing electron and thus ionizing, and the sulfur-based material which is a positive electrode active material is reduced while accepting the electron. In that case, the oxidation reaction of lithium is a process by which lithium metal releases electron and is converted to lithium cation form. In addition, the reduction reaction of sulfur is a process by which the S—S bond accepts two electrons and is converted to a sulfur anion form. The lithium cation produced by the oxidation reaction of lithium is transferred to the positive electrode through the electrolyte and is combined with the sulfur anion generated by the reduction reaction of sulfur to form a salt. Specifically, sulfur before discharging has a cyclic $S_8$ structure, which is converted to lithium polysulfide ($LiS_x$) by the reduction reaction. When the lithium polysulfide is completely reduced, lithium sulfide ($Li_2S$) is produced.

Sulfur, which is a positive electrode active material, is difficult to secure reactivity with electrons and lithium ions in a solid state due to its low electrical conductivity characteristics. In the existing lithium-sulfur secondary battery, in order to improve the reactivity of sulfur, an intermediate polysulfide in the form of $Li_2S_x$ is generated to induce a liquid phase reaction and improve the reactivity. In this case, an ether-based solvent such as dioxolane and dimethoxy ethane, which are highly soluble for lithium polysulfide, is used as a solvent for the electrolyte solution.

As described above, lithium polysulfide, which is an intermediate product formed during charging/discharging of the lithium-sulfur secondary battery, plays a role in allowing the battery to operate and at the same time, is a major cause of deterioration in battery performance.

In the conventional lithium-sulfur secondary battery, a catholyte-type lithium-sulfur secondary battery system is built to improve the reactivity. In the case of such a catholyte-type electrolyte solution, reactivity is increased by using a solvent that can dissolve a large amount of lithium polysulfide. However, due to the characteristics of lithium polysulfide dissolved in the electrolyte solution, the reactivity and lifetime characteristics of sulfur are affected depending on the content of the electrolyte solution. In order to develop a lithium-sulfur secondary battery having a high energy density of 500 Wh/kg or more, which is required for aircraft and next-generation electric vehicles, an electrode with high sulfur loading and low porosity is required and it is necessary to minimize the content of the electrolyte solution.

However, due to the characteristics of the catholyte-type electrolyte solution, there is a problem that as the content of the electrolyte solution is decreased, the viscosity is increased rapidly during charging/discharging, and thus the overvoltage may be increased and the battery may be deteriorated.

Therefore, it is necessary to inject a low amount of electrolyte solution. However, as the content of the electrolyte solution is decreased, the concentration of lithium polysulfide in the electrolyte solution is increased, and thus due to the decrease in fluidity of the active material and increase in side reactions, it is difficult to operate the battery normally.

Alternatively, research is being conducted for an electrolyte system of sparingly solvating electrolyte (SSE) that forms lithium polysulfide in trace amounts only on the electrode surface.

Since lithium polysulfide is hardly dissolved in the SSE system, the loss of sulfur in the electrode is small, and it is operated even in the electrode with low porosity, but there is a problem that due to the high viscosity and low ion conductivity of the electrolyte solution, it is difficult to construct at room temperature and the overvoltage is high. In addition, energy density is also approaching the limit, so there is a situation where additional measures are required. In order to build a lithium-sulfur secondary battery with a high energy density, there is a need for a battery system capable of driving an electrode having high loading and low porosity, and research on such a battery system is continuously being conducted in that technical field.

PRIOR ART DOCUMENT

Non-Patent Document (Non-Patent Document 1) Abbas Fotouhi et al., Lithium-Sulfur Battery Technology Readiness and Applications—A Review, Energies 2017, 10, 1937.

DISCLOSURE

Technical Problem

It is an object of the present invention to provide a lithium-sulfur secondary battery comprising a positive electrode that satisfies specific conditions of high loading and low porosity in order to construct a lithium-sulfur secondary battery of high energy density, wherein the lithium-sulfur secondary battery has an increased initial discharging capacity and an increased average discharging voltage by containing a nitrile-based solvent, a fluorinated ether-based solvent, and a disulfide-based solvent in an appropriate volume ratio in the electrolyte solution.

Technical Solution

In order to achieve the above object, the present invention provides a lithium-sulfur secondary battery comprising a positive electrode, a negative electrode, a separator, and an electrolyte solution, wherein the electrolyte solution contains a lithium salt and a solvent, the solvent contains a nitrile-based solvent, a fluorinated ether-based solvent and a disulfide-based solvent, and the content of the disulfide-based solvent is 20 to 35% by volume based on the total volume of the solvent.

In addition, the present invention provides a lithium-sulfur secondary battery in which the lithium salt is at least one selected from the group consisting of LiCl, LiBr, LiI, LiClO$_4$, LiBF$_4$, LiB$_{10}$Cl$_{10}$, LiB(Ph)$_4$, LiC$_4$BO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, LiN(C$_2$F$_5$SO$_2$)$_2$, LiN(SO$_2$F)$_2$, lithium chloroborane, lithium lower aliphatic carboxylate, and lithium imide.

In addition, the present invention provides a lithium-sulfur secondary battery in which the concentration of the lithium salt is 1.5M (mol/L) to 2.5M (mol/L).

In addition, the present invention provides a lithium-sulfur secondary battery in which the nitrile-based solvent is at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

In addition, the present invention provides a lithium-sulfur secondary battery in which the content of the nitrile-based solvent is 25 to 35% by volume based on the total volume of the solvent.

In addition, the present invention provides a lithium-sulfur secondary battery in which the fluorinated ether-based solvent is at least one selected from the group consisting of 2,2,2-trifluoroethylmethylether (CF$_3$CH$_2$OCH$_3$), 2,2,2-trifluoroethyldifluoromethylether (CF$_3$CH$_2$OCHF$_2$), 2,2,3,3,3-pentafluoropropylmethylether (CF$_3$CF$_2$CH$_2$OCH$_3$), 2,2,3,3,3-pentafluoropropyldifluoromethylether (CF$_3$CF$_2$CH$_2$OCHF$_2$), 2,2,3,3,3-pentafluoropropyl-1,1,2,2-tetrafluoroethylether (CF$_3$CF$_2$CH$_2$OCF$_2$CF$_2$H), 1,1,2,2-tetrafluoroethylmethylether (HCF$_2$CF$_2$OCH$_3$), 1,1,2,2-tetrafluoroethylethylether (HCF$_2$CF$_2$OCH$_2$CH$_3$), 1,1,2,2-tetrafluoroethylpropylether (HCF$_2$CF$_2$OC$_3$H$_7$), 1,1,2,2-tetrafluoroethylbutylether (HCF$_2$CF$_2$OC$_4$H$_9$), 2,2,3,3-tetrafluoroethyldifluoromethylether (H(CF$_2$)$_2$CH$_2$O(CF$_2$)H), 1,1,2,2-tetrafluoroethylisobutylether (HCF$_2$CF$_2$OCH$_2$CH(CH$_3$)$_2$), 1,1,2,2-tetrafluoroethylisopentylether (HCF$_2$CF$_2$OCH$_2$C(CH$_3$)$_3$), 1,1,2,2-tetrafluoroethyl-2,2,2-trifluoroethylether (HCF$_2$CF$_2$OCH$_2$CF$_3$), 1,1,2,2-tetrafluoroethyl-2,2,3,3-tetrafluoropropylether (HCF$_2$CF$_2$OCH$_2$CF$_2$CF$_2$H), hexafluoroisopropylmethylether ((CF$_3$)$_2$CHOCH$_3$), 1,1,3,3,3-pentafluoro-2-trifluoromethylpropylmethylether ((CF$_3$)$_2$CHCF$_2$OCH$_3$), 1,1,2,3,3,3-hexafluoropropylmethylether (CF$_3$CHFCF$_2$OCH$_3$), 1,1,2,3,3,3-hexafluoropropylethylether (CF$_3$CHFCF$_2$OCH$_2$CH$_3$), and 2,2,3,4,4,4-hexafluorobutyldifluoromethylether (CF$_3$CHFCF$_2$CH$_2$OCHF$_2$).

In addition, the present invention provides a lithium-sulfur secondary battery in which the disulfide-based solvent is dimethyl disulfide.

In addition, the present invention provides a lithium-sulfur secondary battery in which the content of the nitrile-based solvent is 25 to 35% by volume based on the total volume of the solvent, the content of the fluorinated ether-based solvent is 30 to 50% by volume based on the total volume of the solvent, and the content of the disulfide-based solvent is 20 to 35% by volume based on the total volume of the solvent.

In addition, the present invention provides a lithium-sulfur secondary battery in which the content of the nitrile-based solvent is 25 to 35% by volume based on the total volume of the solvent, and the volume ratio of the fluorinated ether-based solvent and the disulfide-based solvent is 1:0.75 to 1:1.

In addition, the present invention provides a lithium-sulfur secondary battery in which the positive electrode has an SC factor value of 0.45 or more, expressed by Equation 1 below.

$$SC\ \text{factor} = \alpha \times \frac{L}{p} \qquad \text{[Equation 1]}$$

wherein P is the porosity (%) of the positive electrode active material layer in the positive electrode, L is the mass of sulfur per unit area (mg/cm$^2$) of the positive electrode active material layer in the positive electrode, and $\alpha$ is 10 (constant).

The present invention provides a lithium-sulfur secondary battery in which the mass of sulfur per unit area (mg/cm$^2$) of the positive electrode active material layer in the positive electrode is 2.5 mg/cm$^2$ to 5.0 mg/cm$^2$.

The present invention provides a lithium-sulfur secondary battery in which the porosity (%) of the positive electrode active material layer in the positive electrode is 50 to 70%.

Advantageous Effects

The lithium-sulfur secondary battery according to the present invention exhibits high initial discharging capacity and average discharging voltage by using an electrolyte solution containing a nitrile-based solvent, a fluorinated ether-based solvent, and a disulfide-based solvent in a specific volume ratio in the solvent for the positive electrode that satisfies the specific conditions of high loading and low porosity.

In addition, the electrolyte solution used in the lithium-sulfur secondary battery according to the present invention comprises a solvent containing a nitrile-based solvent, a fluorinated ether-based solvent, and a disulfide-based solvent in a specific volume ratio, and thus the viscosity of the electrolyte solution is decreased and the ion conductivity of the electrolyte solution is increased. Therefore, for the positive electrode that satisfies specific conditions of high loading and low porosity, effects of increasing the average discharging voltage of the lithium-sulfur secondary battery containing the electrolyte solution, reducing the overvoltage and improving the initial discharging capacity are shown.

DESCRIPTION OF DRAWINGS

FIG. 1 is a graph showing the measured viscosities of electrolyte solutions according to Preparation Example 1 and Comparative Preparation Example 1.

FIG. 2 is a graph showing measured ion conductivities of electrolyte solutions according to Preparation Example 1 and Comparative Preparation Example 1.

FIG. 3 is a graph showing initial charging/discharging characteristics (0.1 C/0.1 C) of the lithium-sulfur secondary battery according to Example 1.

FIG. 4 is a graph showing initial charging/discharging characteristics (0.1 C/0.1 C) of the lithium-sulfur secondary battery according to Comparative Example 1.

FIG. 5 is a graph showing charging/discharging characteristics (0.1 C/0.3 C) in the 10th cycle of lithium-sulfur secondary batteries according to Example 1 and Comparative Example 1.

BEST MODE

All embodiments provided according to the present invention can be achieved by the following description. The following description should be understood as describing preferred embodiments of the present invention, and it should be understood that the present invention is not necessarily limited thereto.

The present invention provides a lithium-sulfur secondary battery comprising a positive electrode, a negative electrode, a separator, and an electrolyte solution.

The lithium-sulfur secondary battery according to the present invention may comprise a positive electrode having a low porosity and a high loading amount of sulfur which is a positive electrode active material. In that case, when the porosity in the positive electrode is lowered and the content of the positive electrode active material is increased, the energy density of the battery comprising the positive electrode is increased. However, in the lithium-sulfur secondary battery, if the porosity of the positive electrode is reduced to a minimum and the sulfur content is increased to the maximum, since the ratio of electrolyte solution per unit sulfur content decreases, it is difficult to achieve the target performance when applying this positive electrode to the lithium-sulfur secondary battery.

In the present invention, it is intended to provide a lithium-sulfur secondary battery having a high initial discharging capacity and a high average discharging voltage, when actually implemented, as compared to a conventional lithium-sulfur secondary battery, by specifying conditions related to sulfur in a positive electrode and limiting the conditions of an electrolyte solution suitable for use with such a positive electrode.

In the present invention, the positive electrode is not particularly limited, but may be a lithium thin film or a positive electrode in which a positive electrode active material layer is formed on one surface of a current collector. If the positive electrode is a positive electrode in which a positive electrode active material layer is formed on one surface of the current collector, the positive electrode may be prepared by applying a positive electrode active material slurry comprising a positive electrode active material on one surface of the current collector and drying it. In that case, the slurry may further include additives such as a binder, an electrically conductive material, a filler, and a dispersing agent in addition to the positive electrode active material.

The positive electrode active material is not particularly limited, but may be, for example, a sulfur-based active material, a manganese-based spinel active material, a lithium metal oxide, or a mixture thereof.

Specifically, the sulfur-based compound may be $Li_2S_n$ (n≥1), an organosulfur compound, or a carbon-sulfur polymer $((C_2S_x)_n: x=2.5\sim50, n\geq2)$. The lithium metal oxide may be a lithium-manganese-based oxide, a lithium-nickel-manganese-based oxide, a lithium-manganese-cobalt-based oxide, and a lithium-nickel-manganese-cobalt-based oxide.

Specifically, the positive electrode active material may be $LiCoO_2$, $LiNiO_2$, $LiMnO_2$, $LiMn_2O_4$, $Li(Ni_aCo_bMn_c)O_2$ (wherein 0<a<1, 0<b<1, 0<c<1, a+b+c=1), $LiNi_{1-y}Co_yO_2$, $LiCo_{1-y}Mn_yO_2$, $LiNi_{1-y}Mn_yO_2$ (wherein 0≤y<1), $Li(Ni_{d-}Co_eMn_f)O_4$ (wherein 0<d<2, 0<e<2, 0<f<2, d+e+f=2), $LiMn_{2-z}Ni_zO_4$, or $LiMn_{2-z}Co_zO_4$ (wherein 0<z<2).

The binder is a component that assists in bonding between the positive electrode active material and the electrically conductive material and bonding to the current collector, and may typically be added in an amount of 1 wt. % to 30 wt. % based on the total amount of the slurry of the positive electrode active material. The binder is not particularly limited, but may be, for example, any one selected from the group consisting of poly(vinylidene fluoride-co-hexafluoropropylene) (PVDF-co-HFP), polyvinylidene fluoride, polyacrylonitrile, polymethyl methacrylate, polyvinyl alcohol, carboxymethylcellulose (CMC), starch, hydroxypropyl cellulose, regenerated cellulose, polyvinyl pyrrolidone, polytetrafluoroethylene, polyethylene, polypropylene, polyacrylic acid, ethylene-propylene-diene monomer (EPDM), sulfonated-EPDM, styrene-butadiene rubber (SBR), fluorine rubber, and the mixture thereof.

The electrically conductive material is not particularly limited, but may be, for example, graphites such as natural graphite or artificial graphite; carbon blacks such as carbon black (super-p), acetylene black, Ketjen black, channel black, furnace black, lamp black, thermal black, and Denka black; electrically conductive fibers such as carbon fiber or metal fiber; carbon fluoride; metal powders such as aluminum powder and nickel powder; electrically conductive whiskers such as zinc oxide and potassium titanate; electrically conductive metal oxides such as titanium oxide; or electrically conductive materials such as polyphenylene derivatives. The electrically conductive material may typically be present in an amount of 0.05 wt. % to 5 wt. % based on the total weight of the slurry of the positive electrode active material.

The filler is a component for inhibiting the expansion of a positive electrode. The filler may be used or not, depending on necessity, and is not particularly limited as long as it is a fibrous material without causing chemical changes in the battery, and examples thereof may comprise olefinic polymers such as polyethylene and polypropylene; and fibrous materials such as glass fibers and carbon fibers.

The dispersing agent (dispersion) is not particularly limited, but may be, for example, isopropyl alcohol, N-methylpyrrolidone (NMP), acetone and the like.

The coating can be performed by a method commonly known in the art, but can be performed, for example, by distributing a slurry of positive electrode active material on one surface of the positive electrode current collector and then uniformly dispersing the slurry using a doctor blade or the like. In addition, the coating can be performed by a method such as die casting, comma coating, screen printing and the like.

The drying is not particularly limited, but may be performed within one day in a vacuum oven at 50° C. to 200° C.

The positive electrode of the present invention manufactured by the above-described material and method is classified by the SC factor value represented by Equation 1 below.

$$SC\ factor = \alpha \times \frac{L}{p} \qquad \text{[Equation 1]}$$

wherein P is the porosity (%) of the positive electrode active material layer in the positive electrode, L is the mass of sulfur per unit area ($mg/cm^2$) of the positive electrode active material layer in the positive electrode, and α is 10 (constant).

The mass of sulfur per unit area ($mg/cm^2$) of the positive electrode active material layer in the positive electrode of the lithium-sulfur secondary battery according to the present invention may be 2.5 $mg/cm^2$ to 5.0 $mg/cm^2$, and preferably 3.0 $mg/cm^2$ to 4.5 $mg/cm^2$. If the mass of sulfur per unit area of the positive electrode active material layer in the positive electrode is less than the above range, there is a problem that it is difficult for the lithium-sulfur secondary battery comprising the same to meet the energy density of 500 Wh/kg or more. If the mass of sulfur per unit area of the positive electrode active material layer in the positive electrode exceeds the above range, there is a problem that the profile of charging/discharging capacity is not properly expressed. Accordingly, it is preferable that the mass of sulfur per unit area of the positive electrode active material layer in the positive electrode satisfies the above range.

In addition, the porosity (%) of the positive electrode active material layer in the positive electrode of the lithium-sulfur secondary battery according to the present invention may be 50 to 70%, preferably 55 to 65%. If the porosity (%) of the positive electrode active material layer in the positive electrode exceeds the above range, there is a problem that performance is decreased due to an increase in penetration of electrolyte solution and volumetric change of the active material during the charging/discharging process. If the porosity (%) of the positive electrode active material layer in the positive electrode is less than the above range, there is a problem that the energy density per volume is decreased. Accordingly, it is preferable that the porosity of the positive electrode active material layer in the positive electrode satisfies the above range.

The lithium-sulfur secondary battery according to the present invention may have of the SC factor value of 0.45 or more, preferably 0.5 or more, in order to realize high energy density by organic combination of the negative electrode, the separator and the electrolyte, as well as the positive electrode described above and in order for the lithium-sulfur secondary battery to realize high energy density. If the SC factor value is 0.45 or more, in the case of a conventional lithium-sulfur secondary battery, performance such as energy density of the battery in actual implementation is deteriorated, but in the case of the lithium-sulfur secondary battery according to the present invention, the performance of the battery is maintained without deterioration even in actual implementation.

In the present invention, the negative electrode may comprise a negative electrode current collector and a negative electrode active material layer formed on the negative electrode current collector.

The negative electrode active material layer may comprise a negative electrode active material, a binder, and an electrically conductive material. The negative electrode active material may comprise a material capable of reversibly intercalating or deintercalating lithium ion (Li+), a material capable of reacting with lithium ion to reversibly form lithium containing compounds, lithium metal, or lithium alloy. The material capable of reversibly intercalating or deintercalating lithium ion (Li+) can be, for example, crystalline carbon, amorphous carbon, or a mixture thereof. The material capable of reacting with lithium ion (Li+) to reversibly form lithium containing compounds may be, for example, tin oxide, titanium nitrate, or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

The binder is not limited to the above-mentioned binders, and can be any binder that can be used as a binder in the art.

The constitution of the current collector and the like, except for the negative electrode active material and the electrically conductive material, can be performed by the materials and methods used in the above-mentioned positive electrode.

In the present invention, the separator is a physical separator having a function of physically separating electrodes. Any separator can be used without any particular limitations as long as it is used as a conventional separator. Particularly, a separator with excellent humidification ability for the electrolyte solution while exhibiting low resistance to ion migration of electrolyte solution is preferable.

In addition, the separator enables the lithium ion to be transported between the positive electrode and the negative electrode while separating or insulating the positive electrode and the negative electrode from each other. Such separator may be made of a porous, nonconductive or insulating material having a porosity of 30 to 50%.

Specifically, a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, etc. may be used, and a nonwoven fabric made of glass fiber having high melting point or the like can be used. Among them, the porous polymer film is preferably used.

If the polymer film is used for both the buffer layer and the separator, the impregnation amount and ion conduction characteristics of the electrolyte solution are decreased and the effect of reducing the overvoltage and improving the capacity characteristics becomes insignificant. On the contrary, if the nonwoven fabric material is used for both the buffer layer and the separator, a mechanical stiffness cannot be ensured and thus a problem of short circuit of the battery occurs. However, if a film-type separator and a polymer nonwoven fabric buffer layer are used together, the mechanical strength can also be ensured together with the improvement effect of the battery performance due to the adoption of the buffer layer.

The ethylene homopolymer (polyethylene) polymer film may be used as a separator, and the polyimide nonwoven fabric may be used as a buffer layer. In that case, it is preferable that the polyethylene polymer film has a thickness of 10 to 25 μm and a porosity of 40 to 50%.

In the present invention, the electrolyte solution is a non-aqueous electrolyte solution containing a lithium salt, and may contain the lithium salt and a solvent.

The lithium salt is a material that can be easily dissolved in a non-aqueous organic solvent, and may be, for example, at least one selected from the group consisting of LiCl, LiBr, LiI, $LiClO_4$, $LiBF_4$, $LiB_{10}Cl_{10}$, $LiB(Ph)_4$, $LiC_4BO_8$, $LiPF_6$, $LiCF_3SO_3$, $LiCF_3CO_2$, $LiAsF_6$, $LiSbF_6$, $LiAlCl_4$, $LiSO_3CH_3$, $LiSO_3CF_3$, LiSCN, $LiC(CF_3SO_2)_3$, $LiN(CF_3SO_2)_2$, $LiN(C_2F_5SO_2)_2$, $LiN(SO_2F)_2$, lithium chloroborane, lithium lower aliphatic carboxylate, and lithium imide. In one embodiment of the present invention, the lithium salt may be preferably a lithium imide such as LiTFSI.

In addition, the concentration of the lithium salt may be 1.5 to 2.5M (mol/L), preferably 1.7 to 2.3M (mol/L), and more preferably 2.0M (mol/L) depending on various factors such as the exact composition of the electrolyte solution, the solubility of the salt, the conductivity of the dissolved salt, the charging and discharging conditions of the battery, the operating temperature, and other factors known in the lithium secondary battery field. If the concentration of the lithium salt is less than the above range, there is a problem that side reactions between solvent molecules and Li metal occur. If the concentration of the lithium salt exceeds the above range, the ion conductivity of the electrolyte solution decreases, which may reduce battery performance. Accordingly, it is preferable to select the appropriate concentration of the lithium salt within the above range.

The solvent may include a nitrile-based solvent, a fluorinated ether-based solvent, and a disulfide-based solvent.

The nitrile-based solvent may be at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

In addition, the content of the nitrile-based solvent may be 25 to 35 vol. %, preferably 30 to 35 vol. %, and more preferably 30 to 33.3 vol. % based on the total volume of the solvent. If the content of the nitrile-based solvent is less than the above range, there is a problem that the concentration of the lithium salt soluble in the electrolyte solution is limited. If the content of the nitrile-based solvent exceeds the above range, there is a problem that the viscosity of the electrolyte solution is increased and the ion conductivity is decreased. Accordingly, it is preferable to select the content of the nitrile-based solvent within the above range.

The type of the fluorinated ether-based solvent is not particularly limited as long as it is a fluorinated ether-based solvent generally used in the relevant technical field, and may be, for example, at least one selected from the group consisting of 2,2,2-trifluoroethylmethylether ($CF_3CH_2OCH_3$), 2,2,2-trifluoroethyldifluoromethylether ($CF_3CH_2OCHF_2$), 2,2,3,3,3-pentafluoropropylmethylether ($CF_3CF_2CH_2OCH_3$), 2,2,3,3,3-pentafluoropropyldifluoromethylether ($CF_3CF_2CH_2OCHF_2$), 2,2,3,3,3-pentafluoropropyl-1,1,2,2-tetrafluoroethylether ($CF_3CF_2CH_2OCF_2CF_2H$), 1,1,2,2-tetrafluoroethylmethylether ($HCF_2CF_2OCH_3$), 1,1,2,2-tetrafluoroethylethylether ($HCF_2CF_2OCH_2CH_3$), 1,1,2,2-tetrafluoroethylpropylether ($HCF_2CF_2OC_3H_7$), 1,1,2,2-tetrafluoroethylbutylether ($HCF_2CF_2OC_4H_9$), 2,2,3,3-tetrafluoroethyldifluoromethylether ($H(CF_2)_2CH_2O(CF_2)H$), 1,1,2,2-tetrafluoroethylisobutylether ($HCF_2CF_2OCH_2CH(CH_3)_2$), 1,1,2,2-tetrafluoroethylisopentylether ($HCF_2CF_2OCH_2C(CH_3)_3$), 1,1,2,2-tetrafluoroethyl-2,2,2-trifluoroethylether ($HCF_2CF_2OCH_2CF_3$), 1,1,2,2-tetrafluoroethyl-2,2,3,3-tetrafluoropropylether ($HCF_2CF_2OCH_2CF_2CF_2H$), hexafluoroisopropylmethylether (($CF_3)_2CHOCH_3$), 1,1,3,3,3-pentafluoro-2-trifluoromethylpropylmethylether (($CF_3)_2CHCF_2OCH_3$), 1,1,2,3,3,3-hexafluoropropylmethylether ($CF_3CHFCF_2OCH_3$), 1,1,2,3,3,3-hexafluoropropylethylether ($CF_3CHFCF_2OCH_2CH_3$), and 2,2,3,4,4,4-hexafluorobutyldifluoromethylether ($CF_3CHFCF_2CH_2OCHF_2$), and may preferably be 1,1,2,2-tetrafluoroethyl-2,2,3,3-tetrafluoropropylether ($HCF_2CF_2OCH_2CF_2CF_2H$).

The disulfide-based solvent may be at least one selected from the group consisting of dialkyl disulfides such as dimethyl disulfide, diethyl disulfide, di-n-propyl disulfide, di-isopropyl disulfide, di-n-butyl disulfide, di-isobutyl disulfide, di-sec-butyl disulfide, di-tert-butyl disulfide, di-n-pentyl disulfide, di-tert-pentyl disulfide, diisopentyl disulfide, di-n-heptyl disulfide, di-tert-octyl disulfide, di-n-decyl disulfide, and dicyclohexyl disulfide; disulfides having aromatic ring groups such as dibenzyl disulfide, diphenyl disulfide, di-p-tolyl disulfide, and 5,5'-dithiobis (2-nitrobenzoic acid); disulfides having heterocyclic groups such as 2,2'-dipyridyldisulfide, 4,4'-dipyridyldisulfide, 2,2'-dithiobis (5-nitropyridine), 6,6'-dithiodinicotinic acid, and 2,2'-dipyrimidinyl disulfide, and may preferably be dimethyl disulfide.

In addition, the content of the disulfide-based solvent may be 10 to 40 vol. %, and preferably 20 to 35 vol. %, based on the total volume of the solvent. If the content of the disulfide-based solvent is less than the above range, there are problems that the effect of decreasing the viscosity of the electrolyte solution and increasing the ion conductivity does not occur sufficiently, and the initial discharging capacity of the lithium-sulfur secondary battery comprising the same is decreased due to a side reaction having an unintended reaction mechanism. If the content of the disulfide-based solvent exceeds the above range, there are problems that the lithium salt in the electrolyte solution is not sufficiently dissolved and not sufficiently mixed with the nitrile-based solvent, resulting in layer separation of the electrolyte solution. Accordingly, it is preferable that the content of the disulfide-based solvent satisfies the above range.

By adjusting the volume ratio of the nitrile-based solvent, fluorinated ether-based solvent, and disulfide-based solvent in the electrolyte solution of the present invention, the viscosity of the electrolyte solution is decreased, the ion conductivity of the electrolyte solution is increased, the average discharging voltage of the lithium-sulfur secondary battery comprising the same is increased, and the energy capacity is increased.

Specifically, in the electrolyte solution of the present invention, the content of the nitrile-based solvent may be 25 to 35 vol. % based on the total volume of the solvent, the content of the fluorinated ether-based solvent may be 30 to 50 vol. % based on the total volume of the solvent, and the content of the disulfide-based solvent may be 20 to 35 vol. % based on the total volume of the solvent. In addition, in the electrolyte solution of the present invention, the content of the nitrile-based solvent may be 25 to 35 vol. % based on the total volume of the solvent, and the volume ratio of the fluorinated ether-based solvent and the disulfide-based solvent may be 1:0.75 to 1:1. If the volume ratio of the fluorinated ether-based solvent and the disulfide-based solvent is less than the above range, there are problems that the effect of decreasing the viscosity of the electrolyte solution and increasing the ion conductivity does not occur sufficiently, and the initial discharging capacity of the lithium-sulfur secondary battery comprising the same is decreased due to a side reaction having an unintended reaction mechanism. If the volume ratio of the fluorinated ether-based solvent and the disulfide-based solvent exceeds the above range, there are problems that the lithium salt in the electrolyte solution is not sufficiently dissolved and not sufficiently mixed with the nitrile-based solvent, resulting in layer separation of the electrolyte solution. Accordingly, it is preferable that the volume ratio of the fluorinated ether-based solvent and the disulfide-based solvent satisfies the above range.

The lithium-sulfur secondary battery of the present invention can be manufactured by disposing a separator between a positive electrode and a negative electrode to form an electrode assembly and inserting the electrode assembly into a cylindrical battery case or a rectangular battery case, and then injecting an electrolyte. Alternatively, the lithium-sulfur secondary battery of the present invention can be manufactured by laminating the electrode assembly, impregnating the electrode assembly with the electrolyte, putting the obtained result into a battery case, and then sealing it.

Hereinafter, preferred examples are presented to aid the understanding of the present invention, but the following examples are only provided to more easily understand the present invention, and the present invention is not limited thereto.

EXAMPLE

Preparation of Electrolyte Solution for
Lithium-Sulfur Secondary Battery

Preparation Example 1

Lithium bis(trifluoromethylsulfonyl)imide (LiTFSI) was added at a concentration of 2M (mol/L) to 30 vol. % of acetonitrile based on the total volume of the solvent, and dissolved at room temperature for 6 hours, and then 1,1,2, 2-tetrafluoroethyl-2,2,3,3-tetrafluoropropylether (TTE) and dimethyldisulfide (DMDS) were added in an amount of 40 vol. % and 30 vol. %, respectively, based on the total volume of the solvent, and stirred at room temperature to prepare an electrolyte solution for a lithium-sulfur secondary battery.

Preparation Example 2

An electrolyte solution for a lithium-sulfur secondary battery was prepared in the same manner as in Preparation Example 1, except that 1,1,2,2-tetrafluoroethyl-2,2,3,3-tet-rafluoropropylether (TTE) and dimethyldisulfide (DMDS) were all added in an amount of 35 vol. % based on the total volume of the solvent.

Preparation Example 3

An electrolyte solution for a lithium-sulfur secondary battery was prepared in the same manner as in Preparation Example 1, except that acetonitrile was added in an amount of 33 vol. % based on the total volume of the solvent, and both 1,1,2,2-tetrafluoroethyl-2,2,3,3-tetrafluoropropylether (TTE) and dimethyldisulfide (DMDS) are added in an amount of 33.3 vol. % based on the total volume of the solvent.

Preparation Example 4

An electrolyte solution for a lithium-sulfur secondary battery was prepared in the same manner as in Preparation Example 1, except that acetonitrile was added in an amount of 30 vol. % based on the total volume of the solvent, and 1,1,2,2-tetrafluoroethyl-2,2,3,3-tetrafluoropropylether (TTE) and dimethyldisulfide (DMDS) are added in amounts of 50 vol. % and 20 vol. %, respectively, based on the total volume of the solvent.

Comparative Preparation Example 1

An electrolyte solution for a lithium-sulfur secondary battery was prepared in the same manner as in Preparation Example 1, except that 1,1,2,2-tetrafluoroethyl-2,2,3,3-tet-rafluoropropylether (TTE) is added in an amount of 70 vol. % based on the total volume of the solvent.

Comparative Preparation Example 2

An electrolyte solution for a lithium-sulfur secondary battery was prepared in the same manner as in Preparation Example 1, except that 1,1,2,2-tetrafluoroethyl-2,2,3,3-tetrafluoropropylether (TTE) and dimethyldisulfide (DMDS) are added in amounts of 60 vol. % and 10 vol. %, respectively, based on the total volume of the solvent.

Comparative Preparation Example 3

An electrolyte solution for a lithium-sulfur secondary battery was prepared in the same manner as in Preparation Example 1, except that 1,1,2,2-tetrafluoroethyl-2,2,3,3-tet-rafluoropropylether (TTE) and dimethyldisulfide (DMDS) are added in amounts of 30 vol. % and 40 vol. %, respectively, based on the total volume of the solvent.

Comparative Preparation Example 4

An electrolyte solution for a lithium-sulfur secondary battery was prepared in the same manner as in Preparation Example 1, except that 1,1,2,2-tetrafluoroethyl-2,2,3,3-tet-rafluoropropylether (TTE) and dimethyldisulfide (DMDS) are added in amounts of 20 vol. % and 50 vol. %, respectively, based on the total volume of the solvent.

Comparative Preparation Example 5

An electrolyte solution for a lithium-sulfur secondary battery was prepared in the same manner as in Preparation Example 1, except that acetonitrile was added in an amount of 15 vol. % based on the total volume of the solvent, and 1,1,2,2-tetrafluoroethyl-2,2,3,3-tetrafluoropropylether (TTE) and dimethyldisulfide (DMDS) are added in amounts of 70 vol. % and 15 vol. %, respectively, based on the total volume of the solvent.

Compositions of the electrolyte solutions for lithium-sulfur secondary batteries of Preparation Examples 1 to 4 and Comparative Preparation Examples 1 to 5 are as shown in Table 1 below.

TABLE 1

| | Composition of solvent (vol. %) | | |
| --- | --- | --- | --- |
| | ACN | TTE | DMDS |
| Preparation Example 1 | 30 | 40 | 30 |
| Preparation Example 2 | 30 | 35 | 35 |
| Preparation Example 3 | 33.3 | 33.3 | 33.3 |
| Preparation Example 4 | 30 | 50 | 20 |
| Comparative Preparation Example 1 | 30 | 70 | — |
| Comparative Preparation Example 2 | 30 | 60 | 10 |
| Comparative Preparation Example 3 | 30 | 30 | 40 |
| Comparative Preparation Example 4 | 30 | 20 | 50 |
| Comparative Preparation Example 5 | 15 | 70 | 15 |

Experimental Example 1: Measurement of
Viscosity and Ion Conductivity of Electrolyte
Solution The electrolyte solutions according to Preparation Examples 1 to 4 and Comparative Preparation Examples 1 to 5 were measured for ion conductivity at 22° C. using an ion conductivity measuring device (Seven compact S230, Mettler Toledo company), and for viscosity at 22° C. using a viscometer (μVISC, Rheo sense company).

The results are as shown in Table 2 below, and FIGS. 1 and 2.

TABLE 2

| | Ion conductivity(mS/cm) | Viscosity(cP) |
|---|---|---|
| Preparation Example 1 | 3.42 | 4.28 |
| Preparation Example 2 | 3.43 | 4.60 |
| Preparation Example 3 | 4.12 | 4.00 |
| Preparation Example 4 | 3.33 | 4.89 |
| Comparative Preparation Example 1 | 2.49 | 7.07 |
| Comparative Preparation Example 2 | 2.85 | 5.66 |
| Comparative Preparation Example 3 | — | — |
| Comparative Preparation Example 4 | — | — |
| Comparative Preparation Example 5 | — | — |

As shown in Table 2 above, it was confirmed that when the concentration of lithium salt (LiTFSI) is as high as 3 to 3.3M, the electrolyte solutions of Preparation Examples 1 to 4 to which a disulfide-based solvent (DMDS) is added have low viscosity and high ion conductivity, as compared to the case where disulfide-based solvent (DMDS) was not added (Comparative Preparation Example 1) (see FIGS. 1 and 2 below). In addition, it was confirmed that in the case where the concentration of the lithium salt (LiTFSI) is 3M, when the content of the disulfide-based solvent (DMDS) is less than 10 vol. % (Comparative Preparation Example 2), the initial capacity of the lithium-sulfur secondary battery is decreased. This is because the content of the disulfide-based solvent (DMDS) is too small, and thus the effect of decreasing the viscosity and increasing the ion conductivity is insufficient and a side reaction with an unintended reaction mechanism occurs. In addition, it was confirmed that when the content of disulfide-based solvent (DMDS) is 40 vol. % or more (Comparative Preparation Example 3 and Comparative Preparation Example 4), the lithium salt is not sufficiently dissolved and cannot be sufficiently mixed with the nitrile-based solvent, resulting in layer separation of the electrolyte solution. In addition, it was confirmed that when the nitrile-based solvent is less than 20 vol. % (Comparative Preparation Example 5), the viscosity is high and lithium salt is not sufficiently dissolved.

Manufacture of Lithium-Sulfur Secondary Battery

Example 1

Water was used as a solvent, and sulfur, Super-P (SP), an electrically conductive material, and a binder were mixed with a ball mill to prepare a composition for forming a positive electrode active material layer. At this time, Denka black was used as the electrically conductive material, and a binder in the form of a mixture of SBR and CMC was used as the binder. The mixing ratio by weight was set so that sulfur and SP (9:1 ratio):electrically conductive material: binder is 90:10:10. The prepared composition for forming a positive electrode active material layer was applied to an aluminum current collector and then dried to prepare a positive electrode (energy density of the positive electrode: 4.2 mAh/cm$^2$). The porosity of the positive electrode active material layer calculated by measuring the weight of the electrode and the thickness of the electrode (using TESA-μHITE equipment from the TESA company) in the prepared positive electrode was 58% and the mass of sulfur per unit area of the positive electrode active material layer was 3.24 mg/cm$^2$. The SC factor value calculated based on this was 0.59.

After positioning the positive electrode and the negative electrode prepared by the above method to face each other, a polyethylene separator having a thickness of 20 μm and a porosity of 45% was interposed between the positive electrode and the negative electrode.

After that, an electrolyte solution was injected into the case to manufacture a lithium-sulfur secondary battery. In that case, the electrolyte solution of Preparation Example 1 described above was used as an electrolyte solution.

Example 2

A lithium-sulfur secondary battery was manufactured in the same manner as in Example 1, except that the electrolyte solution of Preparation Example 2 described above is used as an electrolyte solution.

Example 3

A lithium-sulfur secondary battery was manufactured in the same manner as in Example 1, except that the electrolyte solution of Preparation Example 3 described above is used as an electrolyte solution.

Example 4

A lithium-sulfur secondary battery was manufactured in the same manner as in Example 1, except that the electrolyte solution of Preparation Example 4 described above is used as an electrolyte solution.

Comparative Example 1

A lithium-sulfur secondary battery was manufactured in the same manner as in Example 1, except that the electrolyte solution of Comparative Preparation Example 1 described above is used as an electrolyte solution.

Comparative Example 2

A lithium-sulfur secondary battery was manufactured in the same manner as in Example 1, except that the electrolyte solution of Comparative Preparation Example 2 described above is used as an electrolyte solution.

Comparative Example 3

A lithium-sulfur secondary battery was manufactured in the same manner as in Example 1, except that the electrolyte solution of Comparative Preparation Example 3 described above is used as an electrolyte solution.

Comparative Example 4

A lithium-sulfur secondary battery was manufactured in the same manner as in Example 1, except that the electrolyte solution of Comparative Preparation Example 4 described above is used as an electrolyte solution.

Comparative Example 5

A lithium-sulfur secondary battery was manufactured in the same manner as in Example 1, except that the electrolyte solution of Comparative Preparation Example 5 described above is used as an electrolyte solution.

Experimental Example 2: Measurement of Initial Discharging Capacity and Average Discharging Voltage The lithium-sulfur secondary batteries according to Examples 1 to 4 and Comparative Examples 1 to 5 were measured for capacity from 1.0 to 3.6V at 35° C. using a charging/discharging measuring device (LAND CT-2001A, Wuhan).

Specifically, the initial discharging was initially performed at 0.1 C, then the charging/discharging were performed twice at 0.1 C/0.1 C, and then the charging/discharging were performed at 0.1 C/0.3 C, and thus the first discharging capacity (initial discharging capacity) was measured at 0.1 C, and the average discharging voltage at the time of the $10^{th}$ discharging was measured.

The results are as shown in Table 3 below and FIGS. 3 to 5.

TABLE 3

| | Initial discharging capacity(mAh/g) | Average discharging voltage(V) |
|---|---|---|
| Example 1 | 1709 | 1.95 |
| Example 2 | 1654 | 1.94 |
| Example 3 | 1655 | 1.95 |
| Example 4 | 1510 | 1.91 |
| Comparative Example 1 | 1469 | 1.79 |
| Comparative Example 2 | 875 | 1.88 |
| Comparative Example 3 | — | — |
| Comparative Example 4 | — | — |
| Comparative Example 5 | — | — |

As shown in Table 3, it was confirmed that when the concentration of lithium salt (LiTFSI) is as high as 3 to 3.3M, the initial discharging capacity of the lithium-sulfur secondary batteries of Examples 1 to 4 to which a disulfide-based solvent (DMDS) was added is remarkably improved, and their average discharging voltage is also remarkably improved, as compared to the case where disulfide-based solvent (DMDS) was not added (Comparative Example 1) (see FIGS. 3 to 5). In addition, it was confirmed that the initial discharging capacity of the lithium-sulfur secondary batteries of Examples 1 to 4 in which a disulfide-based solvent (DMDS) was added in an amount of 20 vol. % to 35 vol. % is significantly improved, and their average discharging voltage is also remarkably improved, as compared to the case where disulfide-based solvent (DMDS) is added in an amount of 10 vol. % or less (Comparative Example 2). In contrast, in Comparative Example 2 above, the content of the disulfide-based solvent (DMDS) was not sufficient (10 vol. %) despite the addition of the disulfide-based solvent, so the effect of decreasing the viscosity of the electrolyte solution and increasing the ion conductivity was insufficient, and the initial discharging capacity of the lithium-sulfur secondary battery was remarkably lowered by side reactions with an unintended reaction mechanism. On the other hand, in the case of Comparative Examples 3 to 5, the initial discharging capacity and average discharging voltage could not be measured due to layer separation of the electrolyte solution and insufficient dissolution of the lithium salt, as described in Comparative Preparations 3 to 5.

All simple variations or modifications of the present invention fall within the scope of the present invention, and the specific scope of protection of the present invention will be clear by the appended claims.

The invention claimed is:

1. A lithium-sulfur secondary battery comprising:
   a positive electrode;
   a negative electrode;
   a separator; and
   an electrolyte solution comprising a lithium salt and a solvent,
   wherein a concentration of the lithium salt is 1.5 M (mol/L) to 2.5 M (mol/L),
   wherein the solvent comprises a nitrile-based solvent, a fluorinated ether-based solvent, and a disulfide-based solvent,
   wherein the nitrile-based solvent is at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile,
   wherein the fluorinated ether-based solvent is at least one selected from the group consisting of 2,2,2-trifluoroethylmethylether($CF_3CH_2OCH_3$), 2,2,2trifluoroethyldifluoromethylether($CF_3CH_2OCHF_2$), 2,2,3,3,3-pentafluoropropylmethylether($CF_3CF_2CH_2OCH_3$), 2,2,3,3,3-pentafluoropropyldifluoromethylether ($CF_3CF_2CH_2OCHF_2$), 2,2,3,3,3-pentafluoropropyl-1,1,2,2-tetrafluoroethylether($CF_3CF_2CH_2OCF_2CF_2H$), 1,1,2,2-tetrafluoroethylmethylether($HCF_2CF_2OCH_3$), 1,1,2,2-tetrafluoroethylethylether ($HCF_2CF_2OCH_2CH_3$), 1,1,2,2-tetrafluoroethylpropylether($HCF_2CF_2OC_3H_7$), 1,1,2,2-tetrafluoroethylbutylether($HCF_2CF_2OC_4H_9$), 2,2,3,3-tetrafluoroethyldifluoromethylether($H(CF_2)_2CH_2O(CF_2)H$), 1,1,2,2-tetrafluoroethylisobutylether ($HCF_2CF_2OCH_2CH(CH_3)_2$), 1,1,2,2-tetrafluoroethylisopentylether($HCF_2CF_2OCH_2C(CH_3)_3$), 1,1,2,2-tetrafluoroethyl-2,2,2-trifluoroethylether($HCF_2CF_2OCH_2CF_3$), 1,1,2,2-tetrafluoroethyl-2,2,3,3-tetrafluoropropylether ($HCF_2CF_2OCH_2CF_2CF_2H$), hexafluoroisopropylmethylether($(CF_3)_2CHOCH_3$), 1,1,3,3,3-pentafluoro-2-trifluoromethylpropylmethylether ($(CF_3)_2CHCF_2OCH_3$), 1,1,2,3,3,3-hexafluoropropylmethylether($CF_3CHFCF_2OCH_3$), 1,1,2,3,3,3-hexafluoropropylethylether($CF_3CHFCF_2OCH_2CH_3$), and 2,2,3,4,4,4-hexafluorobutyldifluoromethylether ($CF_3CHFCF_2CH_2OCHF_2$),
   wherein the disulfide-based solvent is dimethyl disulfide,
   wherein the nitrile-based solvent is present in the solvent in an amount of 25 to 35 vol. % based on the total volume of the solvent, wherein the fluorinated ether-based solvent is present in the solvent in an amount of 30 to 50 vol. % of the total volume of the solvent, wherein the disulfide-based solvent is present in the solvent in an amount of 20 to 35 vol. % based on the total volume of the solvent, wherein the positive electrode has an SC factor value of 0.45 or more, expressed by Equation 1 below [Equation 1]

$$SC \text{ factor} = \alpha \times \frac{L}{P} \qquad \text{[Equation 1]}$$

wherein

P is the porosity (%) of a positive electrode active material layer in the positive electrode, L is the mass of sulfur per unit area (mg/cm²) of the positive electrode active material layer in the positive electrode, and $\alpha$ is 10.

2. The lithium-sulfur secondary battery according to claim 1, wherein the lithium salt is at least one selected from the group consisting of LiCl, LiBr, LiI, LiClO$_4$, LiBF$_4$, LiB$_{10}$Cl$_{10}$, LiB(Ph)$_4$, LiC$_4$BO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN (CF$_3$SO$_2$)$_2$, LiN (C$_2$F$_5$SO$_2$)$_2$, LiN(SO$_2$F)$_2$, lithium chloroborane, lithium lower aliphatic carboxylate, and lithium imide.

3. The lithium-sulfur secondary battery according to claim 1, wherein a volume ratio of the fluorinated ether-based solvent and the disulfide-based solvent is 1:0.75 to 1:1.

4. The lithium-sulfur secondary battery according to claim 1, wherein the mass of sulfur per unit area (mg/cm²) of the positive electrode active material layer in the positive electrode is 2.5 mg/cm² to 5.0 mg/cm².

5. The lithium-sulfur secondary battery according to claim 1, wherein the porosity (%) of the positive electrode active material layer in the positive electrode is 50 to 70%.

* * * * *